Aug. 2, 1960 — L. G. FOWLER — 2,947,408
COTTON HARVESTER ELEVATOR
Filed April 11, 1958 — 3 Sheets-Sheet 1
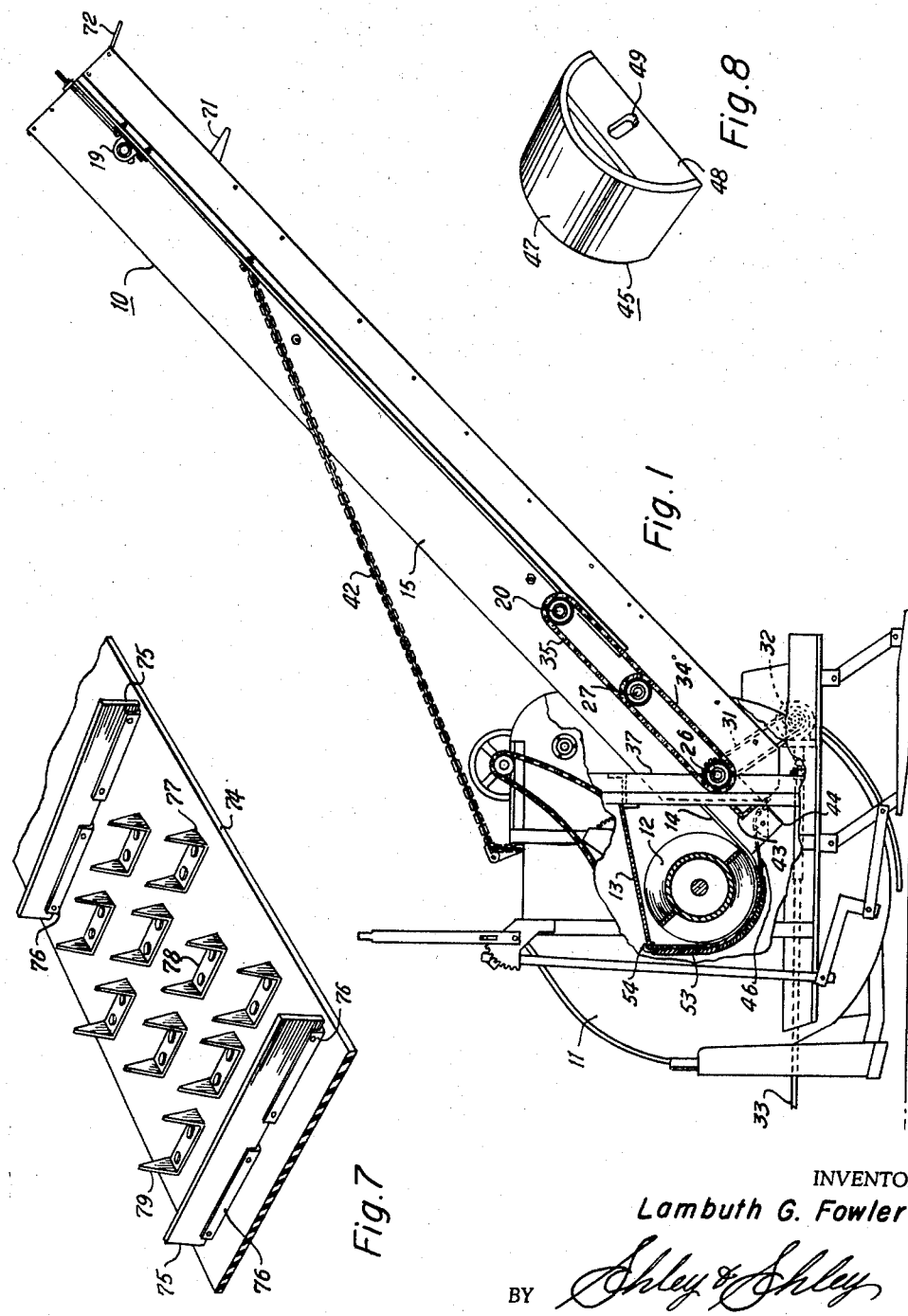
INVENTOR
Lambuth G. Fowler
BY *Shley & Shley*
ATTORNEYS

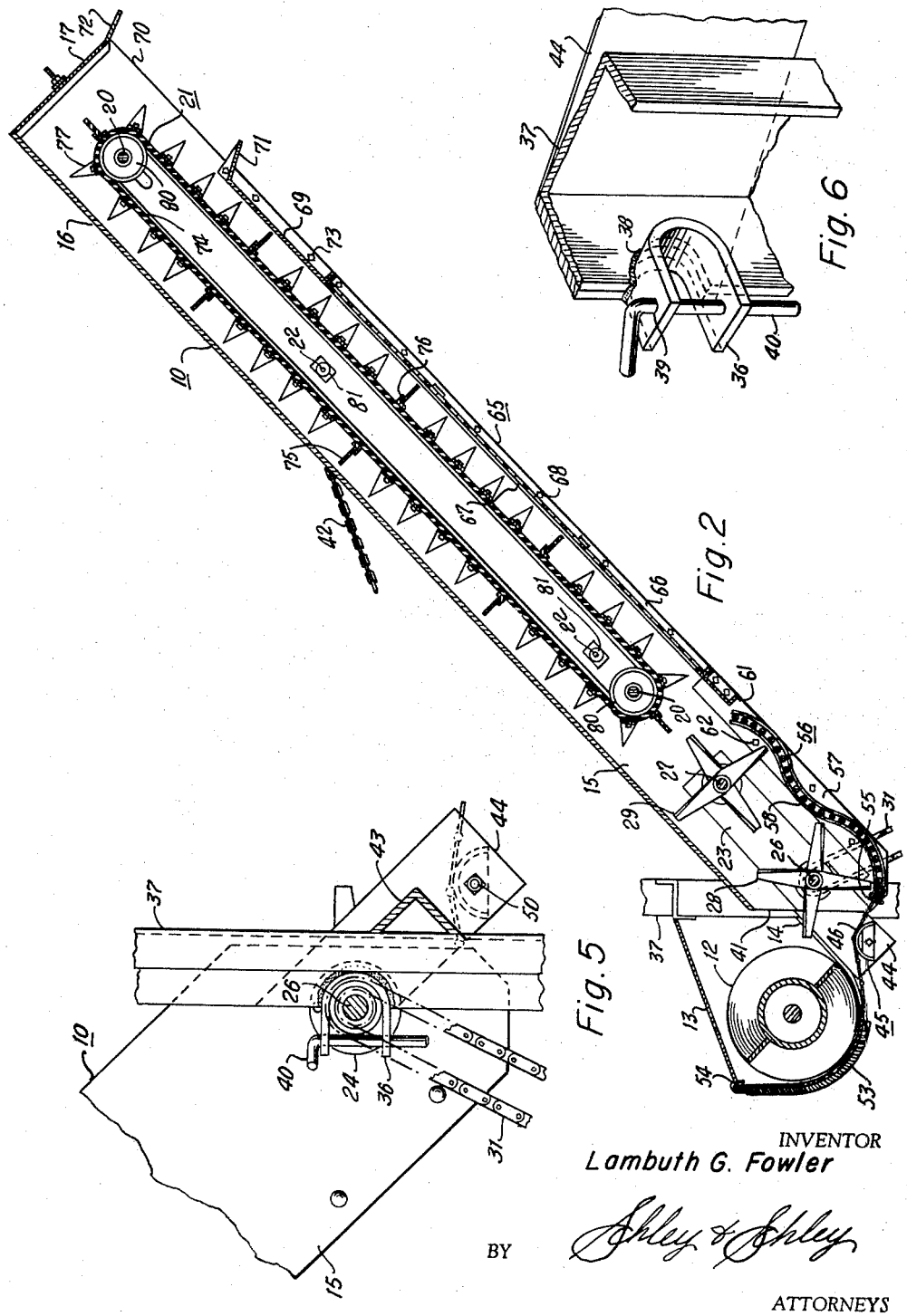

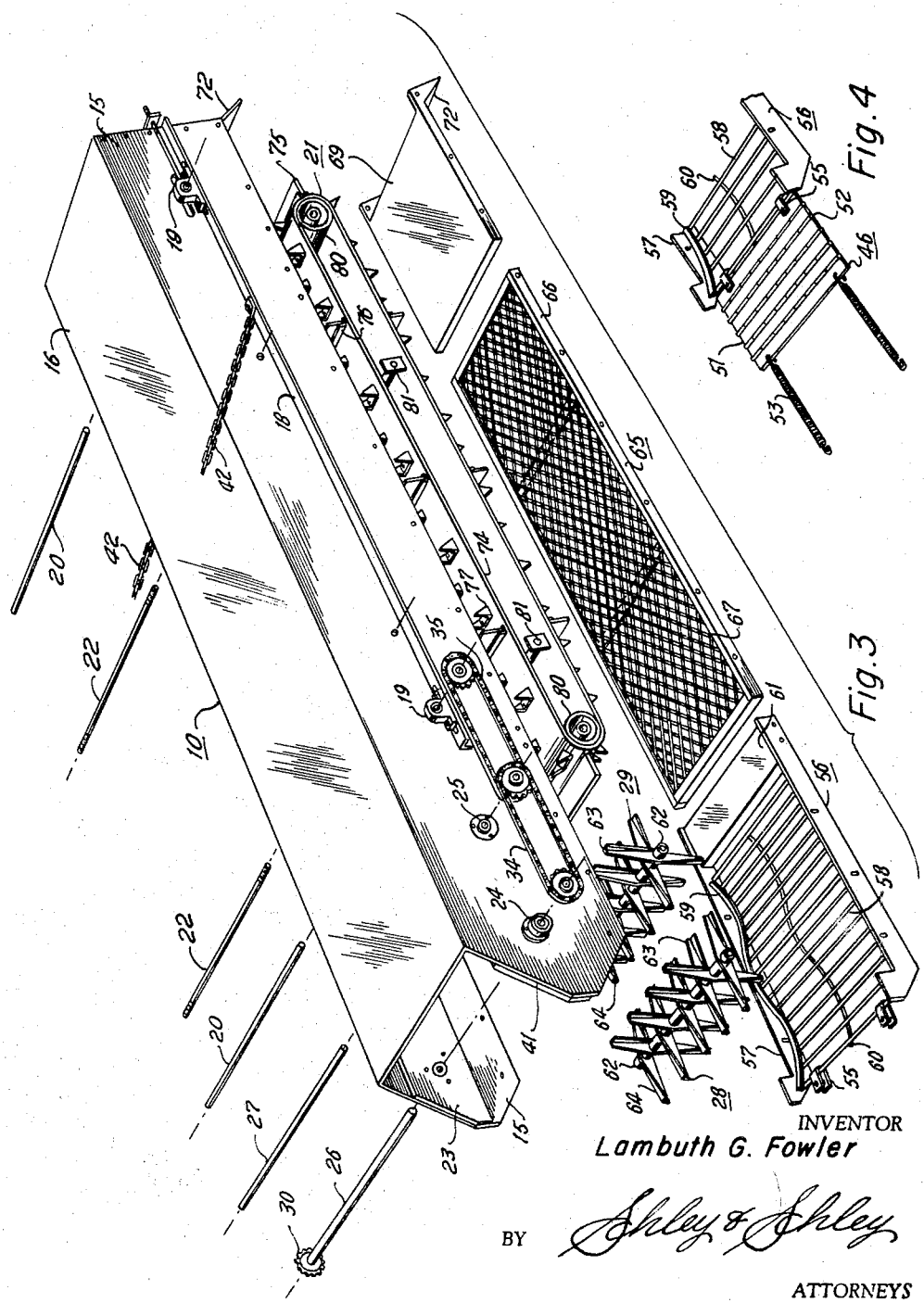

2,947,408
COTTON HARVESTER ELEVATOR
Lambuth G. Fowler, 3511 46th St., Lubbock, Tex.
Filed Apr. 11, 1958, Ser. No. 727,822
5 Claims. (Cl. 198—122)

This invention relates to new and useful improvements in cotton harvester elevators.

One object of the invention is to provide an improved elevator for a cotton harvester which is of such construction that a large portion of the dirt, burrs, sticks, stems and fine trash is more efficiently separated from the dropped out of the cotton.

Another object of the invention is to provide an improved elevator having a housing communicating with a harvester for receiving cotton therefrom and beaters in the housing for opening cotton bolls and for coacting with an underlying screen to separate extraneous matter from the cotton.

A further object of the invention is to provide an improved cotton harvester elevator, of the character described, having an endless conveyor in its housing for receiving the cotton from the beaters and conducting the same to a discharge opening, the conveyor cooperating with an underlying screen for separating and dropping out additional fine matter.

Still another object of the invention is to provide an improved cotton harvester elevator, of the character described, which is so constructed as to be capable of being readily mounted on a cotton harvester of the multi-row type having a horizontal, cross conveyor.

A particular object of the invention is to provide an improved cotton harvester elevator, of the character described, having means for pivotally mounting the elevator housing on the harvester whereby said elevator housing may undergo relative movement and a flexible connector extending between the harvester and housing and functioning as a floor member to direct cotton to said housing and permit pivotal movement for said housing.

A construction designed to carry out the invention will be hereinafter described, together with other features of the invention.

The invention will be more readily understood from a reading of the following specification and by reference to the accompanying drawings, wherein an example of the invention is shown, and wherein:

Fig. 1 is a side elevational view, partly in section, of an elevator constructed in accordance with the invention and mounted on a cotton harvester;

Fig. 2 is a longitudinal, vertical, sectional view of the elevator and the horizontal, cross conveyor of the harvester;

Fig. 3 is an exploded, perspective view of the elevator;

Fig. 4 is a perspective view of the flexible connector at the lower end of the elevator;

Fig. 5 is a side elevation view, partly in section, showing the mounting of the elevator on the frame of the harvester;

Fig. 6 is an enlarged, perspective view of a portion of one of the harvester frame members and its elevator mounting bracket, and Fig. 7 is a perspective view of the frame supports for coacting with the flexible connector.

In the drawings, the numeral 10 designates the housing of an upstanding, inclined elevator which is adapted to extend rearwardly from a cotton harvester 11 for discharging cotton into a following wagon or trailer (not shown). The harvester 11 is of the multi-row, stripper type having a horizontal, cross conveyor 12 enclosed in a suitable casing or housing 13. An opening 14 is formed in the rear, medial portion of the conveyor casing 13 for communicating with the lower portion of the elevator housing. It is noted that this application is a continuation-in-part of my copending application, Serial No. 599,256, filed July 20, 1956, now Patent No. 2,830,424, which shows the construction of the harvester in detail.

As shown most clearly in Figs. 2 and 3, the elevator housing 10 is of elongated, rectangular contour and includes longitudinal side and top walls 15 and 16 and an upper, transverse end wall 17. External angle bars or frame members 18 extend longitudinally and medially of the side walls 15 for adjustably supporting pillow block bearings 19 in which are journaled the ends of the transverse shafts 20 of an endless conveyor 21 disposed in the housing. Preferably, the side walls are connected by tie rods 22 which are mounted between the conveyor shafts 20 and longitudinal reinforcing plates 23 are secured medially to the lower end portions of the inner surfaces of said walls. Below each angle bar 18, a pair of spaced bearings 24 and 25 extend through and are fastened to each side wall and its reinforcing plate 23 for supporting the ends of transverse shafts 26 and 27 of beaters 28 and 29. The lowermost beater shaft 26 carries a sprocket 30 which is adapted to be connected by an endless chain and conventional gearing 32 to a drive shaft 33 carried by the harvester 11 (Figs. 1, 2 and 5). Similar chain and sprocket drives 34 and 35 connect the beater shafts 26 and 27 to each other and said uppermost shaft 27 to the lowermost conveyor shaft 20 whereby all of the shafts are driven in the same direction.

The lower bearings 24 project externally beyond the upper bearings 25 and are adapted to coact with a pair of supporting brackets 36 for connecting the elevator housing to the harvester. As shown most clearly in Figs. 5 and 6, each bracket 36 is welded or otherwise secured to one of a pair of upright, spaced channels or frame members 37 of the harvester rearwardly of its conveyor casing 13. One flange of each channel 37 has a recess 38 to receive the bracket which is of clevis or U-shape and which has its arms extending horizontally and rearwardly of said channel. Alined openings 39 are formed in the outer end portions of the bracket arms for receiving a locking pin 40 and confining one of the bearings 24 in each bracket. As shown by the numeral 41 in Figs. 2 and 3, the front ends of the side walls 15 and their reinforcing plates 23 are cut at an angle so as to terminate substantially flush with the channels and not project to any appreciable extent into the conveyor casing 13. It is noted that the bearings 24 and brackets 36 coact to provide a pivotal mounting for the elevator and permit adjustment of its elevation and inclination by the usual supporting chains 42.

Preferably, each upright channel 37 is reinforced by a horizontal angle bar 43 which extends laterally outward therefrom and which has its inner end bearing against and secured to a flat bar or strap 44. The latter depends forwardly and downwardly from the channel adjacent its recess 38 and bracket 36 and is disposed below and to one side of the conveyor casing opening 14 (Figs. 1 and 2). Each depending bar 44 pivotally supports a rocker element 45 internally thereof for coacting with a flexible connector or floor member 46. As shown most clearly in Fig. 8, each rocker element 45 includes a semi-circular, relatively-wide plate 47 having its end portions connected by transverse flat bars or straps 48. Elongated openings or slots 49 extend transversely of the straps 48 for connecting each rocker element to one of the frame bars 44 by a suitable bolt and nut 50. The straps 48 extend substantially horizontal with the convex surface of the semicircular plate 47 directed upwardly for engaging the underside of the flexible connector 46. Due to the slots 49, the rocker elements may undergo limited vertical movement as well as pivotal movement.

The flexible connector 46 is shown most clearly in Fig. 4 and includes a plurality of elongated, narrow plates or flat bars 51 extending transversely and having coextensive, longitudinal, hinge connections 52 with one another. A pair of helical springs 53 are connected to the frontmost hinged bar 51 for extending around the front portion of the harvester conveyor casing 13 and hooking engagement with the upper portion thereof as shown at 54 in Figs. 1 and 2. The rearmost hinged bar is fastened by a pair of suitable clips 55 to the front end of a foraminous bottom wall 56 at the lower end of the elevator housing. Thus, the hinged bars are resiliently secured in overlying engagement with the rocker elements 45 by the springs 53 to provide a flexible floor beneath the opening 14 and between the harvester conveyor casing and the foraminous floor 56 of the elevator housing for directing cotton from said casing to the lowermost beater. Due to the flexibility and resilient mounting of the connector or floor 46, adjustment of the elevation and inclination of the elevator is permitted and relatively pivotal movement of said elevator is accommodated. It is pointed out that the rocker elements facilitate movement of the flexible connector and support the medial portion thereof above its end portions whereby said end portions are inclined downwardly for coacting with the cross conveyor and the undulating bottom wall.

The foraminous bottom wall 56 underlies the beaters 26 and 27 and undulates in conformity with the arcs of rotation of said beaters for coacting therewith to separate and drop out a large portion of the dirt, burrs, sticks, stems and fine trash intermingled with the cotton. A pair of longitudinal, side rails or flat bars 57 are provided for supporting transverse, spaced cylindrical bars or rods 58 which are reinforced by longitudinal, undulating bars or straps 59 and 60 at their end and medial portions (Fig. 3). The side rails 57 extend rearwardly beyond the rearmost rod 58 and have a plate-like member 61 extending between and connected to their rear end portions. When the foraminous wall is mounted between the elevator housing walls 15 and connected thereto by suitable bolts 62, the member 61 provides an upper, flat surface below and between the upper beater 29 and the lower end of the endless conveyor 21 for directing the cotton to said conveyor (Fig. 2).

It is noted that the beaters are identical and that each includes a hollow axle or axial sleeve 62 for non-rotatable mounting on the shaft 26 or 27. A plurality of blunt pointed blades 63, having lateral flanges 64 at their ends, is carried by each shaft 62 with each blade disposed at a right angle to its adjacent blade. The blades 63 and their flanges 64 coact with the rods 58 to break open cotton bolls into locks and permit dislodging of the cotton therefrom whereby the burrs may be subsequently separated from the cotton. It is pointed out that the lowermost beater 28 is essential for receiving the cotton from the cross conveyor due to the necessity of its strong blades for changing the direction of movement of said cotton from transversely to longitudinally of the harvester.

A foraminous bottom screen or wall 65 underlies the major portion of the endless conveyor 21 and includes a marginal flange 66 for supporting a plate 67 of expanded metal or other reticulated construction. Suitable bolts 68 secure the flange 66 to the side walls 15 of the elevator with the foraminous plate 67 in close proximity to the lower flight of the endless conveyor for coacting therewith to drop out additional fine matter. A solid bottom wall portion or plate 69 extends from the screen 65 to a bottom discharge opening 70 which is adjacent the end wall 17. Preferably, the upper end of the plate 69 and the lower end of the end wall have inclined, rearwardly-directed flanges 71 and 72 depending therefrom for directing the cotton downwardly and rearwardly from the elevator housing. Suitable bolts 73 secure the bottom plate between and to the side walls.

The endless conveyor 21 includes a belt 74, of reinforced rubber or other suitable material, having a plurality of substantially coextensive, transverse, flat blades or cleats 75 of similar material extending outwardly therefrom at evenly spaced intervals. Each blade 75 is fastened to the belt 74 by a pair of alined angle bars 76 (Fig. 7). Between the blades, spaced rows of alined lugs or prongs 77 extend transversely of the belt with the lugs of each row offset or staggered relative to the lugs of adjacent rows. Each lug 77 is substantially U-shaped with its base or bight portion 78 being riveted or otherwise fastened to the belt and its transverse end portions or flanges 79 being triangular or pointed. The blades and lugs on the lower flight of the belt travel in close proximity to the screen 65 and bottom plate 69 to conduct the cotton and larger extraneous matter to the discharge opening 70 while dropping out fine matter through said screen. Suitable rolls 80 are fixed on the shafts 20 for supporting and driving the belt. Preferably, spacer sleeves 81 are carried by the tie rods 22 for reinforcing the side walls 15.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An elevator for a cotton harvester having a discharge opening including a housing having its lower end communicating with the discharge opening, means for pivotally attaching the housing to the harvester whereby said housing may undergo relative movement, and a flexible connector underlying the discharge opening and connecting the lower end of said housing to the harvester to accommodate pivotal movement of said housing, the flexible connector including a plurality of narrow plates extending transversely of said housing and hinged to one another.

2. An elevator as set forth in claim 1 including a rocker element pivotally mounted on the harvester below its discharge opening so as to underlie and support the hinged plates of the flexible connector.

3. An elevator for a cotton harvester having a discharge opening including a housing having its lower end communicating with the discharge opening, means for pivotally attaching the housing to the harvester whereby said housing may undergo relative movement, a flexible connector underlying the discharge opening and connecting the lower end of said housing to the harvester to accommodate pivotal movement of said housing, the flexible connector including a plurality of bars extending transversely of said housing and hinged to one another, and resilient means connecting the frontmost hinged bar to the harvester.

4. An elevator as set forth in claim 3 including a rocker element pivotally mounted on the harvester below its discharge opening so as to underlie and support the hinged bars of the flexible connector.

5. An elevator for a cotton harvester having a discharge opening including a housing having its lower end communicating with the discharge opening, means for pivotally attaching the housing to the harvester whereby said housing may undergo relative movement, a flexible connector underlying the discharge opening and connecting the lower end of said housing to the harvester to accommodate pivotal movement of said housing, and means mounted on the harvester below its discharge opening for supporting the intermediate portion of the flexible connector above its end portions whereby the end portions are inclined downwardly.

References Cited in the file of this patent

UNITED STATES PATENTS

| | | |
|---|---|---|
| 1,724,573 | Gilliland et al. | Aug. 13, 1929 |
| 2,439,718 | Conrad | Apr. 13, 1948 |
| 2,677,226 | Hyman | May 4, 1954 |